3,380,966
Patented Apr. 30, 1968

3,380,966
PROCESS FOR THE MODIFICATION OF RESINOUS OXYMETHYLENE POLYMERS
Hollye R. Fouts, Corpus Christi, Tex., assignor to Celanese Corporation, a corporation of Delaware
No Drawing. Continuation of application Ser. No. 405,276, Oct. 20, 1964. This application Mar. 13, 1967, Ser. No. 622,824
9 Claims. (Cl. 260—67)

ABSTRACT OF THE DISCLOSURE

A process for the production of a modified oxymethylene polymer which comprises dispersing a thermal stabilizer onto the polymer and thereafter uniformly blending and reacting the stabilizer with the polymer by passage of the polymer through a constricted orifice.

---

This invention relates to block and graft oxymethylene polymers. More particularly, it relates to polyoxymethylenes of modified rheological properties.

This application is a continuation of application Ser. No. 405,276, filed Oct. 20, 1964, now abandoned.

Oxymethylene polymers having recurring —$CH_2O$— units have been known for many years. They may be prepared by polymerizing a source of oxymethylene units such as anhydrous formaldehyde or trioxane, a cyclic trimer of formaldehyde.

High molecular weight solid polyoxymethylenes have been prepared by polymerizing trioxane in the presence of cationic catalysts, including such compounds as boron trifluoride, antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, thionyl chloride, fluorosulfonic acid, phosphorus trichloride, titanium tetrachloride, ferric chloride, zirconium tetrachloride, aluminum trichloride, stannic chloride, stannous chloride, and the alkane sulfonic acids as ethane sulfonic acid and methane sulfonic acid.

The preferred catalysts are boron fluoride and the boron fluoride complexes with water (such as boron fluoride monohydrate, boron-fluoride dihydrate, and boron fluoride trihydrate) and boron fluoride coordinate complexes with organic compounds, particularly those in which oxygen or sulfur is the donor atom. The coordinate complex of boron fluoride may, for example, be a complex with an alcohol, a phenol, an acid, an ether, an acid anhydride, an ester, a ketone, an aldehyde; a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfide, and ethyl mercaptan.

Suitable catalysts are disclosed in U.S. Patents 2,989,505, 2,989,506, 2,989,507, 2,989,508, 2,989,509, all of Donald E. Hudgin and Frank M. Berardinelli; 2,989,510, of George J. Bruni; 2,989,511 of Arthur W. Schnizer, and in the article by Kern et al. in Angewandte Chemie, 73, pp. 176–186 (March 21, 1961).

Oxymethylene polymers of improved thermal stability may be prepared by introducing into the polymer chains or attaching to the ends of the polymer chains, structures which are resistant to thermal detachment. The polymers may incorporate interspersed oxyalkylene units with adjacent carbon atoms and preferably oxyethylene units as disclosed in U.S. Patent No. 3,027,352 of Walling, Brown and Bartz. Copolymers of this type may be described as having at least one chain containing oxymethylene (—$CH_2O$—) units (usually at least 85 mol percent) interspersed with (—OR—) units wherein R is a divalent radical containing at least two carbon atoms directly linked to each other and positioned in the chain between the two valences.

Specific interspersed monomeric units which may be incorporated are those derived from lactones, carbonates, cyclic acid anhydrides or ethylenically unsaturated compounds such as styrene, divinyl ether, vinyl acetate, vinyl methyl ketone or acrolein as disclosed in the aforementioned article by Kern et al. The polymers may be end capped as, for example, by acylation or etherification after polymerization or during polymerization by the use of selected chain transfer agents.

Oxymethylene copolymers and terpolymers with such oxacyclic or oxo-functional compounds, as cyclic ethers having at least two cyclic ether rings, dialdehydes and diketones, have also been prepared, as described in, e.g., French Patent No. 1,345,218.

As used in the specification and claims, the term "oxymethylene polymers" denotes homopolymers and copolymers (including terpolymers, etc.) having at least 60% recurring oxymethylene units, and further includes substituted oxymethylene polymers, wherein the substituents are inert, i.e., do not participate in undesirable side reactions.

During molding processes, oxymethylene polymers are generally heated to temperatures between about 180° and 220° C. for relatively short periods between about 3 and about 10 minutes. Unless the thermal degradation rate of the polymer has been reduced to a desirably low level it has been found that molded products have uneven surface characteristics, due to gassing and that the molding operation produces substantial amounts of formaldehyde gas, which constitutes an industrial hazard. In order to overcome this defect and reduce the degradation rate to a desirable level, chemical stabilizers have been added to oxymethylene polymers. Some chemical stabilizers, such as compounds containing 2 or more isocyanate groups, are reactants with the polymer and stabilize by chemical modification of the polymer itself.

It has been the practice to incorporate chemical stabilizers into oxymethylene polymers by separate steps prior to the shaping step. For example, an intimate admixture of the oxymethylene polymer and a diisocyanate may be prepared by dissolving the polymer and the diisocyanate in a common solvent, such as a mixture comprising a major weight proportion of gamma butyrolactone and a minor proportion of tertiary amine, and then precipitating the solutes and washing off the solvent by the addition of water. Chemical stabilizers may also be incorporated into oxymethylene polymers by compounding the stabilizer into the polymer on such apparatus as compounding rolls or dough mixers.

In accordance with the present invention it has been found that in those shaping operations wherein resinous polymer is subjected to elevated temperatures to convert it to plastic form and wherein the resinous polymer in said plastic form is shaped in an operation which includes passage through a constricted orifice, the blending operation may be achieved during passage through the constricted orifice and achieves stabilization of the polymer so quickly that degradation during the shaping step is substantially avoided.

A shaping step which involves passage through a constricted orifice may, for example, be an extrusion operation wherein a shaped orifice produces an elongated shaped article. Or, it may be an injection molding operation wherein shaping takes place after passage of the plastic through the constricted orifice. The shaping operation may be an operation to impart a final shape to the resin, as in the fabrication of a consumer article. Or, it may be an intermediate shaping operation as in the extrusion of resin to produce pellets for later molding into the desired shaped article.

The use of this aspect of the invention is not restricted to any particular chemical stabilizer or stabilizer system. The term "chemical stabilizer," as used herein, is used to designate any compound or mixture of compounds which will reduce the thermal degradation rate of an oxymethylene polymer from a higher rate to a rate not higher than 0.3 weight percent per minute when the polymer is maintained in an open vessel in a circulating air oven at 222° C. The proportion of stabilizer incorporated depends upon the specific stabilizer used. A proportion between about 1 and 5 weight percent (based on the weight of polymer) has been found to be suitable for most stabilizers.

In carrying out this aspect of the invention the chemical stabilizer may be dispersed on the surface of the particles of resinous polymer prior to the conversion thereof to the plastic state, as by tumbling or by wetting of the polymer particles with a solution of the stabilizer in a non-solvent for the polymer followed by the evaporation of the stabilizer solvent. The resinous particles are suitably between about 30 and about 60 mesh.

After the desired amount of chemical stabilizer is dispersed onto the polymer particles, the free-flowing mixture is fed to a chamber wherein it is subjected to elevated temperature and pressure. In the case of shaping by extrusion, the chamber may comprise the barrel of an extruder wherein heating is accomplished through a heating jacket and pressure is applied by the action of the screw. Generally, temperatures between about 165 and 210° C. and pressures between about 100 and 1500 pounds per square inch are applied. The resinous polymer, converted to plastic form and containing the chemical stabilizer passes through the constricted orifice which has a cross-sectional area substantially less than the area of the extruder barrel and preferably less than about 2% of the area of the extruder barrel. During the passage through this constricted orifice uniform admixture is achieved. In the case of a reactant stabilizer, such as diisocyanate, the reaction takes place at this time. Stabilization is achieved immediately and there is little or no decomposition to gaseous by-products.

When isocyanate compounds containing two or more isocyanate groups are used as stabilizers, they may be either aromatic or aliphatic in nature.

Among the suitable aromatic isocyanates are toluene-2,4-diisocyanate, p-phenylene diisocyanate, 4,4'-diphenyl methane-diisocyanate. Aliphatic diisocyanates, such as hexamethylene diisocyanate may also be used. Triisocyanates, such as 4,4',4"-triphenyl methane triisocyanate and the reaction product of trimethylolpropane and 2,4-toluene diisocyanate in a 1:3 mol ratio are also suitable. Blocked isocyanates, such as the reaction product of the last-named compound with 3 mols of phenol may also be used.

Another suitable chemical stabilizer is a combination of an antioxidant ingredient such as phenolic antioxidant and most suitably a substituted bis phenol, and an ingredient to inhibit chain scission, generally a compound or polymer containing trivalent nitrogen atoms which are bonded only to carbon and hydrogen atoms. Suitable scission inhibitors include carboxylic polyamides, polyurethanes, substituted polyacrylamides, polyvinyl pyrolidone, and hydrazides.

For some applications molecular modification of oxymethylene polymers is desirable to provide polymers of modified strength characteristics, flow characteristics, solvency, crystallinity, thermal stability, etc. Of particular interest is the modification of such rheological properties as are critical to commercial molding or forming operations, e.g. injection molding, compression molding, blow molding, fiber spinning, fluidized bed coating, rotational casting, etc., including maintenance of structural integrity over wide molding temperature ranges (e.g., absence of voids, thermal stability, etc.), high processability and particularly modified flow in the melt, increased shear sensitivity, and high melt strength. For example, polymers suitable for commercial extrusion must generally exhibit flow properties represented by melt indicia of 1.0 or less on the $1x$ scale and 25, preferably 30 or greater on the $10x$ scale. In addition, for such applications $10x/x$ ratios, representing, e.g. shear sensitivity, are preferably 25 or higher. Blow molding and vacuum forming applications, on the other hand, call in addition for high melt strengths, e.g. melt elasticity on the order of 20% or higher.

In accordance with a further aspect of the present invention, modified oxymethylene polymers are provided, e.g., by the reaction of an isocyano (—NCO) or isothiocyano (—NCS) terminated oxymethylene polymer with an oxymethylene polymer having a terminal or pendant group containing active or acidic hydrogen as determined by the Zerewitinoff method, by direct treatment at elevated temperatures in plastic state.

In a preferred embodiment, such modified polymers are prepared while the polymer in plastic state is shaped in an operation which may include passage through a constricted orifice, in order to obtain the advantages attendant the use of the first described aspect of the invention, e.g., unitary polymer modification and shaping, with rapid stabilization avoiding substantial degradation.

The modified copolymers representing the preferred aspect of the invention may be prepared by the coupling reaction of oxymethylene segments, in the presence of a bifurcational coupling agent, and preferably those having at least one isocyano or isothiocyano group. In such a reaction system, an isocyano or isothiocyano terminated prepolymer may be generated in situ, where a reaction with one polymeric segment is preferential over another, or coupling may occur through substantially simultaneous reactions of the coupling agent with the polymeric material.

Thus, the copolymers may be provided by the coupling of the polymeric chains in reaction with a bifunctional compound having at least one isocyano or isothiocyano group or by the reaction of a separately prepared isocyano or isothiocyano terminated prepolymer with another polymeric chain having a terminal or pendant group containing active or acidic hydrogen.

The presence of acidic hydrogen may be determined by the Zerewitinoff method, utilizing the reaction of such active, or acidic hydrogen compounds with Grignard reagents, liberating RH corresponding to RMgX. Thus, when a compound containing acidic hydrogen is reacted with methyl magnesium iodide, methane is liberated, giving a positive test. The amount of ilberated methane may be collected and measured, and the number of active hydrogen atoms per mol determined, where the molecular weight is known. A further description of the Zerewitinoff test including modifications of the procedure for various applications, can be found in Grignard Reactions of Non-Metallic Substances, Kharasch, M.S., and Reinmuth, O. (Prentice-Hall, Inc., New York, 1954), pp. 1166–1174.

Suitable substituents containing active hydrogen include amino, amido, hydroxy, carboxy, mercapto, thiocarbonyl, —$CSNH_2$, —$SO_2NH_2$, —$SO_2OH$, etc. Generally, subsitituents containing active or acidic hydrogen atoms are polar, due to their inclusion of atoms more electronegative than carbon, such as oxygen or nitrogen.

Substituents containing active hydrogen react with the isocyano or isothiocyano groups in the following manner:

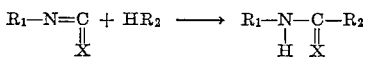

Thus, the copolymers contain the structure:

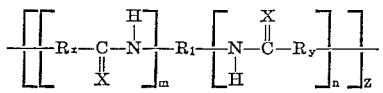

wherein $R_x$ and $R_y$, which may be the same or different, are oxymethylene polymer segments, X is an oxygen or sulfur atom; $R_1$ is an organic radical derived from the coupling agent, and preferably represents a divalent aliphatic[1], cycloaliphatic[2], or aromatic[3] moiety, including the substituted derivatives thereof, having up to about 20 carbon atoms (where the substituents are inert i.e. do not participate in any undesirable side reactions);

$m$ and $n$ are integers from one to two, and $m+n$ is an integer from two to three. The copolymers may, of course, comprise one or more such block structures, as indicated by the subscript Z which is an integer from 1 to 100. $R_x$ and $R_y$ represent the residue of an oxymethylene polymer containing functional groups having active hydrogen atoms, and resulting from abstraction of the active hydrogen atoms from the aforesaid functional groups forming the termini of the designated polymeric segment. Thus, it is to be understood that in the specification and claims the polymeric segments $R_y$ and $R_x$ are inclusive of the pendant or terminal group through which the polymeric segment is bonded to the

group of the preferred coupling agents.

For example, where the terminal group of the polymeric segment is a hydroxy group, reaction with a diisocyanate will result in the structure:

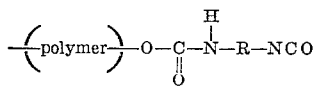

(where $R_x$ or $R_y$ would represent

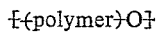

Similarly, where the terminal group is an amino group, reaction with a diisocyanate will result in the structure:

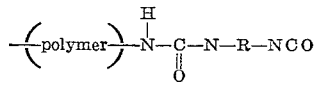

and $R_x$ or $R_y$ would represent

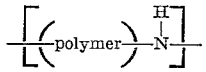

---

[1] Aliphatic being defined as saturated and unsaturated (non-benzenoid) hydrocarbons and their substituted derivatives, having an open chain structure; inclusive of the paraffin, olefin, and acetylene hydrocarbons and further including compounds containing a minor proportion of heteroatoms, selected from the group consisting of oxygen, sulfur, and nitrogen, in the open chain structure; distinguished from aromatic, and cyclic compounds.

[2] Cycloaliphatic being defined identically to 1, supra with the exception that the term encompasses the cyclic aliphatic structures, including the heterocyclics where the heteroatoms are present in minor proportion; distinguished from the open chain aliphatics and the aromatic compounds.

[3] Aromatic being defined as hydrocarbons and their substituted derivatives having at least one ring having benzenoid unsaturation; inclusive of monocyclic, bicyclic, and polycyclic hydrocarbons and those compounds having a minor proportion of heteroatoms selected from the group consisting of oxygen, sulfur, and nitrogen; distinguished from aliphatic and cycloaliphatic compounds.

In the case of a carboxy terminal group, the resulting structure is:

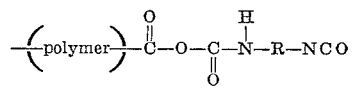

and $R_x$ or $R_y$ would represent

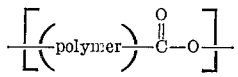

While a representation of the polymeric segments as inclusive of the substituent group is preferable considering the wide variety of groups containing active hydrogen which form the direct bond between the polymeric segment and the bifunctional coupling agent, a more limited class of block copolymers may be represented by the structure:

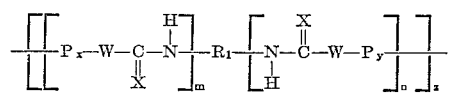

where W is oxygen, sulfur,

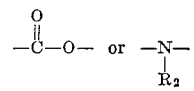

where $R_2$ may be hydrogen, alkyl having one to five carbon atoms, or halogen; $P_x$ and $P_y$, which may be the same or different, are oxymethylene polymer segments, and all other symbols are the same as described above.

While up to as much as 100% of the polymeric chains of the oxymethylene polymers may contain terminal hydroxymethyl or hydroxyalkyl groups (i.e., hydroxy bonded to methylene or higher alkylene groups) the oxymethylene polymers may also contain active hydrogen-containing groups bonded to or adjacent terminal copolymeric units derived from the comonomers described above and in the aforementioned article by Kern et al. (including lactones, carbonates, cyclic acid anhydrides, styrene, divinyl ether, vinyl acetate, vinyl methyl ketone, acrolein, etc.). Also, the terminal groups may be altered by the presence of appropriate chain transfer agents in the polymerization reaction, or by reaction of the polymer with end-capping agents to provide terminal ester, ether, urethane or thiourethane terminal groups. Suitable chain transfer agents include certain formaldehyde impurities such as methanol, formic acid, and water; the agents disclosed in U.S. Patent 3,017,389 of Langsdorf et al., incorporated herein by reference, and including certain carboxylic acids and esters, certain aliphatic alcohols, cycloaliphatic alcohols, aromatic alcohols, carboxylic acid anhydrides, amines, imines, halides, carbonates, silicates, phosphites, thiophanes, aralkyl ethers, sulfides, cyclic sulfoxides, etc.; and the agents disclosed in application Ser. No. 89,371 filed Feb. 15, 1961 by Arthur W. Schnizer, Walter E. Heinz, and Robert M. Seddon and incorporated herein by reference, including certain acetals, hemiacetals, alcohols, carboxylic acids and carboxylic acid anhydrides. Suitable end-capping agents include various organic acids and anhydrides, acyl halides, ketenes, ketene dimers, alcohols, alpha chloroalkyl ethers and their quaternary salts, alkyl halides, epoxides, diazomethane, orthoesters, orthocarbonates, ketals, acetals, alkyl sulfates, alkyl borates, alkyl silicates, alkyl titanates, and alkyl and aryl mono or diisocyanates or isothiocyanates, as further disclosed in Kern et al. Angewandte Chemie 73, pp. 177–186 (1961) and Sittig, M., Hydrocarbon Process and Petroleum Refiner 41, pp. 131–170 (1962). Of course, a single oxymethylene polymer segment may contain one or more such active hydrogen atoms, bonded to the same or different substituent groups, which may be located at terminal or intermediate positions in the polymer chain.

While in certain instances, high molecular weight polymers (i.e., having a number average molecular weight of at least 10,000) are preferred, where dissimilar polyacetal segments are employed and property alteration of greater magnitude is desired the lower molecular weight (e.g., between about 1,000 and about 10,000 number average molecular weight) polymers are preferred, since the incorporation of the lower molecular weight species in an amount equal to that of a higher molecular weight species results in a greater number of moles of polymer incorporated i.e., the resulting copolymer contains to a greater degree a structure of alternating dissimilar polymeric segments.

The higher molecular weight polymers, e.g., having a number average molecular weight of at least 30,000, are preferred for the preparation of shaped articles, and particularly structures formed by commercial molding techniques. A mixtue of high and low molecular weight components is also desirable in certain applications to increase the molecular weight distribution and permit higher $10x/x$ ratios.

In a preferred embodiment, at least one oxymethylene polymer segment is derived from an oxymethylene copolymer which may be described as having at least one chain containing oxymethylene (—$CH_2O$—) units (usually at least 85 mol percent) interspersed with up to about 15 mol percent of (—OR—) units, wherein R is a divalent radical containing at least two carbon atoms directly linked to each other and positioned in the chain between the two valences, with any substituent in the R radical being inert. Suitable such copolymers may have a number average molecular weight of from about 1000 up to about 80,000 or higher, with inherent viscosities ranging from about 0.2 to about 1.5 or higher. Dependent upon the type and extent of property modification sought, the low molecular weight, e.g. 1000 to 10,000, the high molecular weight 30,000 to 80,00 species, or any mixture thereof, may be preferred. The preferred copolymers are disclosed in U.S. Patent No. 3,027,352 of Walling, Brown and Bartz, incorporated herein by reference.

Moldable oxymethylene polymers having branched chains (said chains comprising a plurality of branches of successively recurring oxymethylene units) may also be employed to advantage in the practice of this invention, and may be preferred for certain applications. Such polymers may be prepared by copolymerizing trioxane with a small amount of a chain branching agent, the small amount being sufficient to link some primary oxymethylene chains to provide a branched structure but insufficient to make the polymer intractable. Primary chains are linear chains comprising successively recurring oxymethylene units and are the chains which would be produced if the chain branching agent were omitted from the system. The amount of chain branching agent used is generally not more than that required to provide one link to another chain for each primary chain in the system.

Suitable chain branching agents, depending on the particular circumstances involved, include those having at least two functional oxygen groups including (1) cyclic ethers having at least two cyclic ether rings, such as 2,2-(trimethylene)bis-1,3-dioxolane, and particularly those compounds having (a) at least two epoxy rings, such as polyepoxides, including diepoxides, triepoxides, etc., (b) at least two formal rings, such as pentaerythritol diformal, and (c) at least one epoxy ring and at least one formal ring, such as monocrotylidene trimethylolethane monoepoxide; and (2) compounds having at least two oxo groups such as dialdehydes and diketones such as glutaraldehyde, terephthaldehyde and acrolein dimer.

Suitable polyepoxides include those which may be prepared by the epoxidation of compounds having two or more olefinic linkages. Diepoxides of diolefins are usually used and the epoxidized olefinic bonds may be of aliphatic or cycloaliphatic structures. Particular diepoxides which may be used include butadiene dioxide, vinyl cyclohexene dioxide (1-epoxyethyl-3,4 - epoxycyclohexane), limonene dioxide, resorcinol diglycidyl ether, butane diol digylcidyl ether, bis-epoxydicyclopentyl ether of ethylene glycol, dicyclopentadiene dioxide and dicrotilidene pentaerythritol diepoxide. Suitable triepoxides include triglycidyl trimethylol propane prepared by reacting the triallyl ether of trimethylolpropane in a solvent with peracetic acid at a temperature of 0 to 75° C. (as disclosed in application Ser. No. 152,672, filed on Nov. 15, 1961 by Sammy Carpenter). Suitable polyepoxides include a polyepoxy glyceryl ester containing an average of 5.5 epoxy groups per molecule, known as Epoxol 9–5 (sold by Swift & Co.).

The chain branching agents are usually copolymerized with the trioxane in proportions from about 0.01 to about 7 weight percent, preferably less than about 1%, and most preferably from about 0.05 to about 0.80 weight percent of the chain branching agent based on the weight of trioxane.

The most preferred such polymers are terpolymers of trioxane, a chain branching agent as described above, and a bifunctional compound. Preferred bifunctional compounds include (1) those having at least two functional groups, (2) those having at least one unsaturated bond, (3) at least one openable ring structure and (4) combinations of two or more of (1), (2) and (3). Specific bifunctional materials include those disclosed in this application, in U.S. Patent No. 3,027,352 and the Kern et al. article referred to previously. In accordance with a preferred embodiment, the bifunctional compounds provide —O—R— units interspersed among the oxymethylene groups wherein R is a divalent radical containing at least two carbon atoms directly linked to each other and positioned in the chain between the two valences, with any substituents, e.g., hydrocarbons, halohydrocarbons, being inert e.g. with respect to formaldehyde under the conditions of polymerization.

Preferred terpolymers have chains containing (1) oxymethylene groups interspersed with (2) oxyalkylene groups with adjacent carbon atoms derived from the bifunctional compounds (preferably cyclic ethers having adjacent carbon atoms) and (3) oxyalkylene groups having carbon atoms linked to other chains, the last named groups being derived from the chain branching agents.

Particularly preferred terpolymers are those wherein the (2) oxyalkylene groups with adjacent carbon atoms are oxyethylene groups derived by opening the ring structure of cyclic ethers containing oxyethylene groups, such as ethylene oxide and 1,3 dioxolane.

Other specific cyclic ethers having adjacent carbon atoms which may be used are 1,3,5-trioxepane, 1,3-dioxane, trimethylene oxide, pentamethylene oxide, 1,2-propylene oxide, 1,2-butylene oxide, neopentyl formal, tetrahydro-furane and butadiene monoxide. Because of the fact that the inclusion of the chain branching agent produces polymers of lower melt index, terpolymers containing relatively high proportions of such cyclic ethers with adjacent carbon atoms, e.g. about 10 wt. percent, are substantially improved over comparable copolymers containing no chain branching agent.

In the preferred terpolymers there is generally from about 75 to about 99.5 percent by weight of recurring oxymethylene units, from about 0.5 to about 25 percent by weight of recurring units derived from the bifunctional compound (such as a cyclic ether with adjacent carbon atoms) and from about 0.01 to about 7 weight percent of units derived from the chain branching agent. The most preferred terpolymers have from about 96.1 to 97.9 percent by weight of oxymethylene units and less than about 1%, preferably between about 0.05 and 0.80 percent by weight, of units from the chain branching agent.

Such polymers are more fully disclosed in application Ser. No. 229,715 of Heinz and McAndrew, filed Oct. 10, 1962 and incorporated herein by reference.

For chain extension, the polymers optimally contain no more than two active hydrogen atoms, preferably located at the termini of the polymeric chain. However, suitable polymers also include those having a plurality of active hydrogen atoms located in various positions on the polymeric chain. For example, such polymers are suitable for chain extension where the terminal active hydrogen atoms are more reactive than any located on the polymeric chain between the terminal positions, and may be particularly useful when a chain extended block copolymer capable of further cross-linking is desired. Of course, for a given molecular weight, increased functionality acts to increase the rate of polymer crosslinking.

The coupling agents are suitably bifunctional compounds having at least one isocyano (—NCO) or isothiocyano (—NCS) group, and preferably are organic diisocyanates, (OCN—R—NCO), diisothiocyanates (SCN—R—NCS)

or isocyanate-isothiocyanates (OCN—R—NCS), but may also be of higher functionality (e.g. triisocyanates, polyisocyanates, etc.).

A preferred class of coupling agents has the general formula R(—NCX)$_n$ wherein X is an atom selected from the group consisting of oxygen and sulfur, $n$ is an integer between 1-3, and R is an organic radical derived from the group consisting of aliphatic, cycloaliphatic and aromatic moieties (defined in footnotes 1-3, column 5) having one to twenty carbon atoms, and substituted derivatives thereof, where the substituents are inert i.e., do not participate in undesirable side reactions.

Suitable compounds include, for example, aromatic diisocyanates, such as 2,4 toluene diisocyanate; 2,6 toluene diisocyanate; 1,6 toluene diisocyanate; diphenyl methane 4,4′ diisocyanate; 3,3′ dimethyl diphenyl methane 4,4′-diisocyanate; 3,3′ dimethyl 4,4′ diphenylene diisocyanate (3,3 bitoluene 4,4′ diisocyanate); o,m,p-phenylene diisocyanate; methane diisocyanate; chlorophenylene-2,4-diisocyanate; chlorophenylene 2,4 toluene diisocyanate; 3,3′ dichlorodiphenyl-4,4′-diisocyanate; 4 chloro-, 3-phenylene diisocyanate; xylene 1,4-diisocyanate; dixylylene methane 4,4′ diisocyanate; 1,5 naphthalene diisocyanate, 1,4 naphthalne diisocyanate, and the corresponding diisothiocyanates and the isocyanate-isothiocyanates; alkylene diisocyanates, such as 1,6 hexamethylene diisocyanate; 1,2 ethylene diisocyanate; 1,3-propylene diisocyanate; 1,4 tetramethylene diisocyanate; 1,5 pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate-isothiocyanates; cycloaliphatic diisocyanates, such as 1,3 cyclohexylene diisocyanate; 1,3 cyclopentylene diisocyanate; 1,4 cyclohexylene diisocyanate; 4,4′ methylenebis-(cyclohexyl isocyanate) and the corresponding diisothiocyanates and isocyanate-isothiocyanates; triisocyanates, such as triphenyl methane triisocyanate; 1,3,5 benzene triisocyanate, and the corresponding isothiocyanates and isocyanate-isothiocyanates. Mixtures of any of the aforementioned compounds, such as mixtures of the 2,4 and 2,6 isomers of toluene diisocyanate, may also be desirable in certain applications.

Aramotic diisocyanates, especially derivatives thereof having electronegative substituents are particularly desirable, due to their increased reactivity. The electronegative substituents, such as, for example, —NO$_2$, —C≡N, —CHO,

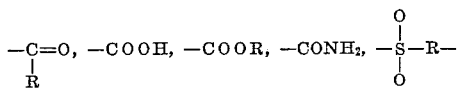

and —CF$_3$ groups, apparently assist the polymerization tendency of the isocyano or isothiocyano groups. The differing reactivities of the isocyano groups may be used to advantage in certain applications. Generally, the reactivity of the second isocyano group decreases upon reaction of the first (e.g. in phenylene diisocyanate, the second isocyano group reacts about half as fast as the first such group to react).

The suitable aromatic bi-functional coupling agents include the polyalkylene polyarylisocyanates such as polymethylene polyphenyl isocyanate, a mixture of compounds having the following generalized structural formula:

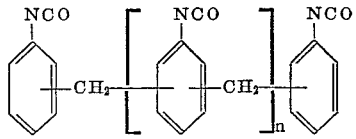

In the above formula $n$ may fairly form an average value of 1 to 3, but preferably has an average value of 1. A material of this composition is sold under the trademark PAPI by the Carwin Company, Northhaven, Conn. This material is a dark, amber, somewhat viscous liquid, having an average molecular weight of 380–400, a viscosity (21° C.) of about 500–1500 centipoises and an average specific gravity of 1.20.

The reaction may be carried out by charging one or more oxymethylene polymers in solid particulate state as e.g. flake or pellets, optionally containing, incorporated therein, suitable chemical stabilizers, together with the bifunctional coupling agent to a reaction zone maintained at an elevated temperature in a range sufficient to permit one or more of the charged polymers to maintain melt state during the reaction. Suitable temperatures are in the range from the softening point of the lower melting polymer to the decomposition temperature of the higher melting polymer. Generally, temperatures between about 100° and about 275° C. are employed, with the range of about 150° to about 250° C. being preferred for a melt state of the preferred oxymethylene copolymers. In view of the increased viscosity of the preferred oxymethylene terpolymers, slightly higher temperatures are employed. Sinc side reactions involving formation of allophanates and biurets increase at higher temperatures, the lower temperature ranges are generally preferred. While atmospheric pressures are preferably for ease of operation lower and higher pressures, e.g. 0 to 1000 p.s.i., are also suitable. While not essential to the reaction, a blanket of inert gas, such as nitrogen, is customarily employed.

While any suitable reaction zone may be employed, preferably the components are blended in a roll mill, plastograph, or a molding or shaping operation, e.g. involving passage through a constricted orifice, such as extrusion or injection molding. The polymers are charged to the reaction zone together with the bi-functional coupling agent and heated to melt whereupon catalyst, if any, is added and the reaction allowed to proceed to completion.

The use of catalysts is not essential to the process of this invention but suitably, catalysts may be employed to optimize rates and cycle times to a range suitable for extrusion application, e.g. on the order of 5 minutes. The process may be catalyzed by any otherwise suitable basic substance free of active hydrogen atoms, such as N-methyl morpholine, triethyl amine, N,N,N′,N′-tetramethyl-1,3 butyl diamine, triethylene diamine, stannous chloride, ferric acetylacetonate, tri-n-butyltin acetonate, bis (2-ethyl hexyl) tin oxide, di-n-butyltin diacetate, di-n-butyltin dilaurate, di-n-butyltin dichlorate, di-n-butyltin-di-lauryl mercaptide, di-n-methyltin dichlorate, stannous octoate, zince stearate, tributylene, triethanolamine, etc. Any other well known urethane catalyst is also applicable. Generally, catalytic amounts of e.g. about 0.001 up to about 5.0 weight percent, based upon the polymer, is employed, although it is to be understood that the basic catalysts may also be employed as acid acceptors in the process described and thus may be provided in excess amounts for the performance of this additional function.

The polymers may be provided in any molar ratio to allow variable modification in properties. The amount of polymeric reactants provided may be varied at the original addition to the reaction zone, or an additional amount of an original reactant or even another reactant may be added during the course of the reaction. Similarly, additional catalyst and/or coupling agent may be advantageously provided during the course of the reaction.

While the coupling agent may be provided in variable amounts (e.g., to effect further reaction, or to provide isocyano or isothiocyano termination), the reagent is preferably provided in amounts between 0.5 mol and 3.0 mols (of isocyano, or isothiocyano groups per mol of active hydrogen, defining one gram atom of active hydrogen as equal to one mole thereof). For chain extension, amounts between about 0.8 to 1.2 mols per mol active hydrogen of the polymeric block are preferably employed. An excess over the 1:1 stoichiometric ratio favors termination of the polymeric segments over coupling and at a molar ratio of 2:1 (i.e. isocyano/active hydrogen) substantially no coupling occurs. Therefore, where an isocyano or thiocyano terminated prepolymer is to be prepared, an excess over the 1:1 stoichiometric ratio and preferably a 2:1 or more excess is desirable.

The oxymethylene polymers are preferably treated in a plastograph blending device which comprises a jacketed chamber containing oppositely rotating rotors having bladed surfaces of, e.g. sigma, delta, roller or cam configuration optionally blanketed in an inert gas, e.g. nitrogen, driven with a constant or variable speed ranging from a few r.p.m. up to about 200 r.p.m. In the practice of this aspect of the invention temperatures in the range of about 165° C. up to 250° C. or higher are obtained by employing a suitable heating oil in the chamber jacket. Generally roller head rotors are employed, driven at speeds in the range of 20 to 40 r.p.m. at temperatures between about 180 and 220° C. The plastograph treatment may be carried out at different r.p.m. and temperatures within the ranges specified above for varied periods of time, giving appropriate consideration to the desirability of reducing shear to a point where mechanical degradation of the resin is minimized, and maintaining temperatures below the point where thermal degradation of the resin becomes substantial, etc. Thus, one may employ a higher speed with reduced treatment periods and slightly increased temperatures or decreased speed for longer times at decreased temperatures. Optimization of rotor speeds and temperatures of treatment permit completion of the reaction within a period of as little as 30 seconds where a catalyst is employed or 3 to 5 minutes where a catalyst is not employed.

The process of this invention may also be carried out in a roll mill apparatus having oppositely rotating hollow cylindrical rolls of, e.g., 12″ diameter, driven at a speed in the range of 20 to 40 r.p.m., and steam heated to a temperature in the range of 165° C. to about 195° C. The cylindrical rolls have a variable clearance ranging down to a few thousandths of an inch which clearance is varied during the course of the milling. A typical run involves charging the resin to the rolls with a load time of about three minutes, rolling for four minutes to melt, adding the bi-functional coupling agent and catalyst, if any, in one or more steps and dispersing well into the melt with further rolling for a period of about 5 minutes for each addition. The reaction mixture, which adheres to the rolls, is kneaded while the clearance between the rolls is decreased for a period of about 5 minutes and then cut and cooled.

Oxymethylene copolymers having interspersed carbon-to-carbon linkages may be stabilized by degrading the unstable end portions of the molecules consisting of successive terminal oxymethylene groups until a stable terminal group having a carbon-to-carbon linkage (e.g., an oxymethylene terminal group) is reached. The degradation may be thermal degradation, as disclosed in U.S. Patent 3,103,499 of Dolce and Berardinelli on Apr. 2, 1959, or by hydrolysis, as disclosed in application S. No. 102,097, continuation-in-part of application S. No. 23,658 filed by Berardinelli on Apr. 21, 1960. The preferred copolymers of this invention may be stabilized by either of these methods, although stabilization by hydrolysis is preferred.

The thermal degradation rate of the preferred block copolymers of this invention is reduced by the incorporation of chemical stabilizers. One suitable stabilizer system is a combination of an anti-oxidant ingredient such as phenolic antioxidant and most suitably a substituted bisphenol, and an ingredient to inhibit chain scission, generally a compound or a polymer containing trivalent nitrogen atoms. A suitable class of alkylene bisphenols includes compounds containing from one to four carbon atoms in the alkylene group, and having from zero to 2 alkyl substituents on each benzene ring, each alkyl substituent having from 1 to 4 carbon atoms. The preferred alkylene bisphenols are 2,2′-methylene bis-(4-methyl-6-tertiary butyl phenol) and 4,4′-butylidene bis-(6 tertiary butyl-3-methyl phenol). Suitable phenolic stabilizers other than alkylene bis-phenols include 2,6-ditertiary butyl-4-methyl phenol, octyl phenol and p-phenyl phenol.

Suitable scission inhibitors for the preferred copolymers include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in application Ser. No. 826,115 filed by Dolce on July 10, 1959, application Ser. No. 831,720 filed by Dolce, Berardinelli and Hudgin on Aug. 5, 1959, application Ser. No. 258,126, continuation-in-part of application S. No. 838,427, filed by Berardinelli on Sept. 8, 1959, application Ser. No. 838,832, filed by Dolce and Hudgin on Sept. 9, 1959, application Ser. No. 262,348, continuation-in-part of application Ser. No. 841,690, filed by Kray and Dolce on Sept. 23, 1959, application Ser. No. 256,146, continuation-in-part of application S. No. 851,560, filed by Berardinelli, Kray and Dolce on Nov. 9, 1959, U.S. Patent 3,133,896 of Dolce and Berardinelli, issued May 19, 1964, and application Ser. No. 4,881 filed by Kray and Dolce on Jan. 27, 1960. The disclosures of the above-mentioned patents and applications are incorporated herein by reference. Such chemical stabilizers may also be employed in the practice of the aspect of this invention described hereinabove, viz the unitary shaping of an acetal polymer and the blending therewith of a chemical stabilizer, e.g. by blending a dry solid stabilizer into the plastic polymer while the latter is being kneaded as on heated rolls or through an extruder.

Molding powders comprising pellets of stabilized polymer may be prepared by conventional pelleting procedures such as extrusion of the polymer into cylindrical extrudates which may range in diameter from about $\frac{1}{16}''$ to about $\frac{1}{4}''$ followed by chopping the extrudates into lengths which may range from about $\frac{1}{16}''$ to about $\frac{1}{4}''$.

The oxymethylene polymeric products provided by the processes described herein are of block or graft polymeric form, i.e. the polymeric segments are bonded to the termini of the original polymeric block to form a linear block copolymer, or may be bonded to the polymeric block at intermediate loci along the polymeric chain giving rise to a graft copolymer. The type of polymeric product may be governed by the position, availability and reactivity of the active hydrogen atoms contained by the polymeric segments.

For example, a primarily linearly chain extended block copolymeric product is formed where the only active hydrogen atoms are bonded to the termini of the polymeric chain. Of course, the chain may also comprise polymeric segments of random form, where one of the original polymer chains consists of a random copolymer.

The preferred polymeric products of this invention are normally solid, moldable, and thermoplastic, but may be capable of further cross-linking where a polyfunctional coupling agent has been utilized or where further reactive groups are available on the polymeric chains. Elastomeric products, for example, may be prepared by the use of a suitable polyfunctional coupling agent. The block copolymer products may, of course, include more than one type of oxymethylene polymer segment or copolymeric segment (e.g., a block copolymer of polyoxymethylene, polyoxymethylene-oxyalkylene and polyamide segments), and the polymer block segments may themselves be of random, block or graft structure.

The modified polymers of this invention are characterized by decreased flow in the melt as represented by e.g. low melt index values in the range of 1.0 or less, preferably below about 0.5 to as little as 0.2, from an initial value of about 9.0. Polymers having an initial melt index of about 2.5 may be similarly modified to values between about 0.5 and 0.3 to as little as 0.05. Of course, as initial melt index values range lower, as with the preferred terpolymers (exhibiting initial melt indices in the range of between about 0.4 and about 1.0) the modification treatment can effect an even lower final melt index value.

$10x$ melt indices may also be substantially altered in the course of the modification process, but are generally affected proportionately less than the $1x$ values, which permits the attainment of high $10x/x$ ratios at low $1x$ values representative of e.g. higher melt elasticities, especially useful in commercial blow molding. Generally $10x$ values may be reduced from a range of about 140–170 to below about 30, preferably between about 15 and 25 and from a range of about 40 to 60 down to between about 5 and 10. Target $10x/x$ ratios of between about 30 and about 85 may be readily achieved in the described modification process.

High melt elasticities generally above about 20 to 30% may also be achieved, as represented by swell characteristics of e.g. about 25/15 (the ratio of percentage swell with respect to orifice size for the first five inches and the second five inches of extrudate). Commercial oxymethylene homopolymers and copolymers with e.g. 1 to 5% of an alkylene oxide, on the other hand, exhibit melt elasticities of below 10%.

These rheological properties make the modified polymers of this invention particularly useful for commercially molded and formed objects, e.g. fibers and fibrous products, both woven and non-woven, knits, etc., such molded products as plumbing fixtures, including faucet handles and spouts, automobile dashboards or inserts therefor, including radio speaker covers, blow-molded aerosol containers, gears, screws, nails, etc.

Excellent thermal stability of e.g. below about 0.3 weight percent per minute at 230° C. is readily secured in these products and may be enhanced by the addition of various chemical stabilizers, including those set forth hereinabove, to levels as low as 0.03 weight percent per minute or less.

The following examples are illustrative of the various aspects of the invention and supplement without limitation the description set forth above.

Inherent viscosities, except as otherwise indicated, were determined as a 0.1% solution of polymer in 98% p-chlorophenol-2% α-pinene at 60° C.

Melt indices were determined by heating a sample of a polymer in a standard cylinder to a standard temperature of 190° C. and forcing it under a standard load of 2.160 kg. through a standard orifice of 0.0825 in. diameter and 0.315 in. long for a standard period and weighing the polymer passing through the orifice during this period. The results are reported in grams per 10 minutes. The test is described in detail in ASTMD–1238–57T.

The melt index ($10x$) is generally used when melt index values are low and is determined in an identical manner except that the standard load is increased tenfold to 21.60 kg.

Thermal degradation rate constants ($K_{D230}$) were determined by blending a 5 gm. polymer sample with a suitable chemical stabilizer system (preferably 0.5 weight percent of 2,2′-methylene bis[4-methyl-6-t-butyl phenol] and 0.1 weight percent of cyanoguanidine, or 0.40–0.65 weight percent of 2,2′-methylene bis[4-methyl-6-t-butylphenol], 0.02–0.04 weight percent of melamine, and 0.08–0.12 weight percent of cyanoguanidine), placing the sample in a circulating air oven maintained at 230° C. for a period of 45 minutes and reweighing the sample. The thermal degradation is expressed as the average rate of weight loss over the test period.

All other test data was determined in accordance with ASTM Standards, except as otherwise indicated. All parts are by weight.

Examples I–V illustrate the incorporation of a chemical stabilizer with the oxymethylene polymer in the course of a shaping operation in melt state.

Example I

To a mixture of 750 grams of cyclohexane, 828 grams of trioxane and 21 grams of dioxolane there was added 0.695 ml. of boron fluoride dibutyl etherate in 78 grams of cyclohexane. The mixture was maintained at 55° C. for 1½ hours with stirring. At the end of this time the reaction mixture, which had been converted to a solid mass was washed with hot water and dried. A yield of 47% of polymer (based on total monomer) was obtained.

The copolymer was treated with Mondur CB (the tritoluene 2,4-diisocyanate adduct of trimethylol propane) in a 75% solution of ethyl acetate. The diisocyanate solution (4 g. per 100 g. of polymer) was dissolved in acetone (375 ml. per 100 g. of polymer) and slurried with the copolymer. The ethyl acetate and acetone were evaporated at 70° C. with stirring, leaving the isocyanate distributed over the polymer. The copolymer thus treated was passed through an extruder having a single flight mallet-type screw 1″ in diameter and 10″ long. The temperature of extrusion was 155° C. and the screw speed was 30 r.p.m. The extrudate, a rod of circular cross section, 0.13 inch in diameter, had a thermal degradation rate (at 222° C. in air) of 0.2 weight percent per minute.

Example II

To a mixture of 3204 grams of trioxane, 1200 grams of cyclohexane and 80 grams of dioxolane there was added 1.15 ml. of boron fluoride dibutyl etherate in 172 grams of cyclohexane. The mixture was maintained at 60° C. for 3 hours and 40 minutes. Forty-five grams of Mondur S in 250 grams of acetone was then added. (Mondur S is the same compound as Mondur CB of Example I but having its free isocyanate groups blocked by reaction with phenol.) The polymer was slurried and dried in Example I. The copolymer was extruded at a screw speed of 25 r.p.m. through the extruder described in Example I at a temperature of 335° F. The material extruded (a circular rod, 0.15 inch in diameter) had a degradation rate (at 222° C. in air) of 0.25 weight percent per minute.

Example III

To a mixture of 4800 grams of trioxane, 2064 grams of cyclohexane and 120 grams of dioxolane there was added 1 ml. of boron fluoride dibutyl etherate. The mixture was maintained at 60° C. for three hours. The reaction was then stopped by the addition of 15 ml. of tri-n-butylamine and two liters of acetone. The polymer was washed four times with acetone and then dried. Its degradation rate without stabilization (at 222° C. in air) was 2.1 wt. percent/min.

The polymer was treated as in Example I to deposit 4 g. of Mondur CB on each 100 g. of polymer. The thus-treated copolymer was extruded through the extruder described about at a screw speed of 20 r.p.m. and at a temperature of 425° F. The extrudate (a circular rod, 0.17 inch in diameter) had a degradation rate (at 222° C. in air) of 0.24 wt. percent/min. for the first 3% of polymer and 0.04 for the remainder.

Example IV

The copolymer of Example III was extruded under conditions similar to those described in Example III except that the screw speed was 31 r.p.m. The extrudate had a degradation rate at 222° C. in air of 0.57 wt. percent/min. for the first 7% and 0.03 for the remainder.

When this experiment was repeated using lower extruding temperatures the extrudate had a degradation rate of 0.72 wt. percent/min. for the first 9% and 0.11 for the remainder when extruded at 400° F., and 0.67 wt. percent/min. for the first 9% and 0.10 for the remainder when extruded at 375° F.

Example V

A mixture of 50 parts by weight of trioxane, 50 parts by weight of cyclohexane and 0.2 part by weight of boron fluoride dibutyl etherate was maintained at an average temperature of 59° C. for a period of 1⅓ hours. The polymeric product (25% yield) was washed with hot water and then dried. The homopolymer was blended with 4 weight percent of Mondur CB in the same manner as described in Example I and the blend was passed through the extruder described in Example I at a temperature of 190° C. and at a screw speed of 21 r.p.m. The extruded product (circular rod, 0.18 inch in diameter) had a thermal degradation rate (at 222° C.) of 1.1 weight percent per minute for the first 26% of the polymer and 0.41 weight percent for the remainder.

When the above experiment was repeated except for an extrusion temperature of 205° C., the extruded product had a thermal degradation rate at 222° C. of 0.4 percent for the first 8% of the polymer and 0.16 percent for the remainder.

Examples VI–X describe the modification of oxymethylene polymer properties by reaction in melt state with diisocyanates.

Example VI

Fifty (50) parts of an oxymethylene copolymer containing 2 weight percent of oxymethylene units, having terminal hydroxyl groups and an inherent viscosity of 1.01 to 1.04, representing a weight average mol wgt. of about 90,000 (and containing incorporated therein 0.5 part of 2,2'-methylene bis[4-methyl-6-t-butyl phenol] and 0.1 part of cyanoguanidine), was charged together with a small amount of a 1,5-naphthalene diisocyanate ("Multrathane N–5," manufactured by Mobay Chemical Co.) to a plastograph (a C. W. Brabender "Plastograph" having roller heads and a capacity of 80 ccs.) and milled in the melt under nitrogen, at 200° C., for 15 minutes, with the following results:

| Sample | Wt. of diisocyanate | Thermal Degradation Rate Constant, Wt. percent/min. | Melt Index (1$x$) | Melt Index (10$x$) | 10$x$ — $x$ | Inherent Viscosity |
|---|---|---|---|---|---|---|
| Control | | 0.009 | 9.22 | 161.1 | 17.4 | 1.01–1.04 |
| 1 | 0.13 | 0.017 | 8.1 | 147.2 | 18.2 | 0.95–1.02 |
| 2 | 0.26 | 0.022 | 5.7 | 123.7 | 21.7 | 0.90–0.94 |
| 3 | 0.52 | 0.024 | 2.2 | 73.8 | 33.5 | 0.90–0.92 |

The reduction in melt index (1$x$) represented 24% of the original value in run number 3, and coupled with a reduction in the 10$x$ melt index to the 46% level (based on the control value) increased the 10$x$/$x$ ratio 48%, based on the original value. The proportionally greater reduction of 1$x$ melt index values is believed to be due to selective chain coupling resulting from the treatment with such low proportions of diisocyanate in melt state.

The higher 10$x$/$x$ ratios thus are believed to represent a broader molecular weight distribution.

It is to be understood that the functionality and molecular weight of the polymer and coupling agent govern the relationship between the molar and weight ratios of polymer to diisocyanate. For example, with 0.1 gram of 1,5 naphthalene diisocyanate and 50 grams of polymer having a number average molecular weight of 35,000, assuming 100% of the polymer chains are terminated at each end with monofunctional active hydrogen containing groups e.g. hydroxy (a 0.2 weight percent level of diisocyanate) there are three mols of polymer available for reaction with 1 mol of diisocyanate. At a 2.0 weight percent level 3 mols of diisocyanate are available for every mol of polymer. Similarly, where hexamethylene diisocyanate is employed as the coupling agent, a 0.2 weight percent level of diisocyanate is equivalent to about 2.4 mols of polymer per mol of diisocyanate, and a 1.0 weight percent level is comparable to 1 mol of polymer per 2.4 mols of diisocyanate.

Example VII

Sixty (60) parts of a trioxane-2 weight percent ethylene oxide copolymer, of inherent viscosity 0.22, was reacted with 2.07 parts of diphenyl methane 4,4' diisocyanate in the melt at 210° C. for 60 minutes, whereupon a copolymer having an inherent viscosity of 0.65 was recovered in quantitative yield.

Example VIII

Fifty (50) parts of "Celcon" acetal copolymer ("M90" grade), in the form of pellets containing a commercial chemical stabilizer system and 1.0 parts of 1,5-naphthalene diisocyanate were charged to a plastograph and milled together under nitrogen in the melt at 200° C., as follows:

| Run No. | Time in Plastograph | Melt Index (1$x$) dg./min. | Melt Index (10$x$) dg./min. | 10$x$ — $x$ | Thermal Degradation Rate Constant at 230° C. wt. percent/min. | I.V. |
|---|---|---|---|---|---|---|
| Control | 0 | 9.1 | 145.3 | 16 | 0.018 | 1.39 |
| 1 | 5 | 3.67 | 96.4 | 26.3 | 0.027 | |
| 2 | 10 | 1.93 | 72.7 | 37.7 | 0.026 | 1.38 |
| 3 | 15 | 0.53 | 37.5 | 70.8 | 0.026 | 1.37 |
| 4 | 45 | 0.82 | 38.6 | 47.1 | 0.018 | 1.36 |

Example IX

Fifty (50) parts of an oxymethylene copolymer containing recurring oxymethylene units and a nominal 2.0 weight percent of oxymethylene units, and having an inherent viscosity of 1.73, representing a weight average molecular weight of about 120,000 (containing incorporated therein 0.5 parts of 2.2' methylene bis[4-methyl-6-t-butyl phenol] and 0.1 parts of cyanoguanidine), was charged to a plastograph together with 1.0 parts of 1,5-naphthalene diisocyanate and the mixture was milled under nitrogen in the melt at 200° C., with the following results:

| Run No. | Time in Plastograph | Melt Index (1$x$) dg./min. | Melt Index (10$x$) dg./min. | 10$x$ — $x$ | Thermal Degradation Rate Constant at 230° C. wt. percent/min. |
|---|---|---|---|---|---|
| Control | 0 | 2.68 | 47.0 | 17.6 | 0.024 |
| 1 | 5 | 0.56 | 20.0 | 35.7 | 0.030 |
| 2 | 10 | 0.35 | 12.67 | 36.2 | 0.023 |
| 3 | 15 | 0.05 | 3.98 | 79.6 | 0.026 |
| 4 | 45 | 0.11 | 5.91 | 53.7 | 0.022 |

Compression molded discs of 2¼" x 125 mills were prepared from the products of runs 2 and 3 and tested for brittleness by driving a common 8 penny nail into the center and into successive positions, 90° apart, ¼" from the periphery of the disc. The number of nails required to effect a break gives a measure of the brittleness of the resin—a value of 5 representing optimum performance. Each of these modified resins gave values of 5, indicating retention of a high degree of thermoplasticity, i.e. an insufficient degree of cross-linking to render the resin of brittle character. Inherent viscosities of these products were 1.63 and 1.67, respectively (each an average of two determinations).

A similar run, employing only 0.511 part of diisocyanate, yielded the following properties, following 15 minutes of milling at 200° C.:

Melt index (1×) _____dg./min__ 1.65
Melt index (10×) _____dg./min__ 37.6
10×/× _____ 22.8
$K_{D230}$ _____wgt.-percent/min__ 0.021

Example X

Fifty (50) parts of trioxane -2.0 wgt. percent ethylene oxide copolymer having a melt index (1x) of 9.1 dg./min., a 10x melt index of 145.3, and a thermal degradation rate constant at 230° C. of 0.018 wgt. percent/min. (the resin contained incorporated therein 0.5 parts of 2,2'-methylene bis[4-methyl-6-t-butyl phenol] and 0.1 parts of cyanoguanidine), and 2.0 parts of a polymethylene polyphenylisocyanate ("PAPI," sold by the Carwin Co.) were charged to a plastograph and milled under nitrogen in the melt at 200° C. for 30 minutes. The product exhibited the following flow properties:

Melt index (1×) _____dg./min__ 1.87
Melt index (10×) _____dg./min__ 67.1
10×/× _____ 35.9

The following examples illustrate the use of various catalysts, effective in reducing residence times to levels appropriate for commercial molding equipment.

Example XI

Fifty (50) parts of an oxymethylene copolymer having 2.0 weight percent of oxymethylene units (having a melt index of 9.1, a 10x melt index of 145, and a 10x/x ratio of 16, containing incorporated therein 0.5 parts of 2,2'-methylene bis[4-methyl-6-t-butyl phenol] and 0.1 part of cyanoguanidine), was reacted with 1.0 weight percent of 1,5-naphthalene diisocyanate in a plastograph under nitrogen in melt state of 200° C., in the presence of 0.005 part of dibutyl tin dilaurate as a catalyst. After 5 minutes of milling the melt index (1x) was reduced to 0.42 dg./min., and the 10x melt index reduced to 25.0 (representing a 10x/x ratio of 60).

Example XII

The foregoing run was repeated, employing 0.1 part of triethylene diamine as a catalyst. After milling for 5 minutes, the resulting product exhibited a melt index (1x) of 0.16 dg./min., and a 10x melt index of 18.2 (a 10x/x ratio of 114).

Example XIII

Fifty (50) parts of an oxymethylene copolymer containing a nominal 2.0 weight percent of oxyethylene units (containing incorporated therein 0.5 part of 2,2'-methylene bis[4-methyl-6-t-butyl phenol] and 0.1 part of cyanoguanidine), and 1.0 part of hexamethylene diisocyanate were charged to a plastograph and milled at 30 r.p.m. under nitrogen in the melt at 200° C. in the presence of 0.1 part of catalyst, as follows:

| Run No. | Catalyst | Milling Time | Melt Index 1x | Melt Index 10x | 10x/x | $K_{D230}$ |
|---|---|---|---|---|---|---|
| Control | | 20 | 9.26 | 159.7 | 17.2 | 0.019 |
| 1 | Triethylene diamine | 15 | 5.25 | 114 | 21.6 | 0.042 |
| 2 | Stannous octoate | 15 | 0.53 | 23 | 44 | 0.032 |
| 3 | Zinc stearate | 15 | 6.36 | 128 | 20 | 0.034 |
| 4 | Stannous octoate | 20 | 0.67 | 30 | 44 | 0.030 |

A constant drive melt index apparatus (a standard melt index apparatus as described above, wherein the piston is forced down at a fixed rate) was employed to measure the melt strengths of the products of runs 1, 2, and 4, utilizing a piston speed of 0.2 inch/min., a temperature of 190° C. and an orifice size of 0.0825 inch. The polymer was extruded to a length of about 12", the times at an extrudate length of 5 and 10 inches being recorded. The extrudate was removed and cut and the first and second 5" segments separately weighed. The extrudate swell was determined by measuring the diameter of the extrudate with a micrometer at 10 different points and recording the average value for the 5" extrudate sections. The following results were obtained:

| Sample | Extrudate Length, in. | Time, sec. | $t_1/t_2$ | Extrudate Wt. | $w_1/w_2$ | Swell, Percent |
|---|---|---|---|---|---|---|
| Control | 0-5 | 30 | 6.0 | 0.224 | 4.35 | (1) |
| | 5-10 | 5 | | 0.051 | | |
| Run No. 1 above | 0-5 | 136 | 2.13 | 1.059 | 1.66 | 43 |
| | 5-10 | 64 | | 0.638 | | 7 |
| Run No. 2 above | 0-5 | 167 | 1.33 | 1.439 | 1.33 | 54 |
| | 5-10 | 126 | | 1.081 | | 38 |
| Run No. 4 above | 0-5 | 151 | 1.18 | 1.358 | 1.23 | 54 |
| | 5-10 | 128 | | 1.103 | | 38 |

[1] Unable to measure.

The high melt elasticities apparent from the reported swell characteristics are particularly important to blow molding and vacuum forming operations, since the resin tends to thicken and foreshorten in emerging from a constricted orifice. In the blow molding this tendency to thicken and foreshorten in a depending parison partially counteracts the effect of gravity on the parison and makes it possible for a larger parison to be maintained without increasing internal stresses caused by the increased weight. Thus, in a blow molding operation larger bottles may be blown without difficulty. In extruding, more intricate and larger profiles may be extruded and better dimensional control may be maintained. In the extrusion of pipe, better control of surface pulsations and wall thickness may be maintained.

Example XIV

An oxymethylene terpolymer of trioxane, containing 2.2% of ethylene oxide and 1.85% of pentraerythritol di-formal (containing 0.5 parts of 2,2'-methylene bis[4-methyl-6-t-butyl phenol] and 0.1 part of cyanoguanidine), was charged to a C. W. Brabender "Plastogmraph" (having roller heads and a capacity of 80 ccs.) together with 2% of hexamethylene diisocyanate and 0.2% of stannous octoate catalyst, and milled at a 205° C. block temperature 6 minutes, with the following results:

| Sample | Melt Index (1x) | Melt Index (10x) | 10x/x |
|---|---|---|---|
| Control | 0.76 | 45.0 | 67 |
| Terpolymer | 0.004-0.01 | 5.8 | >580 |

Tensile impact bars were machined from compression molded (190° C./min. preheat at 2500 lb.; 4 min. at 5000 lb.; cooled at 5000 lb.) 4″ x 4″ x 60 mil plaques, and tensile stress-strain tests were carried out at 110° C. and cross-head speeds of 0.05, 0.2, 1.0 and 5.0 in./min. (corresponding to strain rates of 300, 1200, 6000 and 30,000%/hr.). The linear plot of yield stress versus log strain rate was extrapolated to 1000 p.s.i. yield stress and the time to 5% deformation calculated. The modified terpolymer gave yield stress values of 3280, 3700, 4080 and 4430, res., for a calcuated 192 hours to 5% deformation under 1000 p.s.i. stress, which compared favorably with an untreated terpolymer of substantially the same percentage composition, which gave a value of 74 hours on an injection molded specimen, tested parallel to flow.

A similar run, utilizing 6% hexamethylene diisocyanate and 0.2% gave a calculated value of $6.8 \times 10^8$ hours to 5% deformation at 1000 p.s.i.

Similar results were also obtained when a terpolymer containing 0.4% of vinylcyclohexane diepoxide was employed.

While many of the foregoing examples describe the polymer modification process of this invention in terms of stabilized polymer, samples, it is to be understood that unstabilized polymer, in e.g. flake or pellet form, may be employed with substantially identical results.

This application is a continuation-in-part of copending application S. No. 188,255 filed Apr. 17, 1962, which is a continuation of application S. No. 834,648 filed Aug. 19, 1959.

It is to be understood that the foregoing detailed description is given merely by way of illustration and that many variations may be made therein without departing from the spirit of my invention.

I claim:

1. In the fabrication of shaped articles from resinous polymers consisting essentially of oxymethylene groups and from 0.1 to 15 mole percent of oxyethylene groups, wherein the resinous polymer in particulate form is subjected to elevated temperature and pressure to convert it to plastic form and wherein said resinous polymer is shaped while in plastic form by passage through a shaped constricted orifice in an operation which would ordinarily be accompanied by polymer gassing and degradation, the improvement which comprises dispersing onto said particulate polymer a reactant thermal stabilizer having the formula $R'—(NCX)_n$ wherein X is an atom selected from the group consisting of oxygen and sulfur, $n$ is an integer selected from the group consisting of 2 and 3, and $R'$ is an organic radical derived from the group consisting of aliphatic, cycloaliphatic and aromatic moieties having one to twenty carbon atoms, and thereafter, prior to reacting any of said stabilizer with said polymer, in one operation uniformly blending and reacting said stabilizer with the polymer by the passage of said polymer through said constricted orifice so as to reduce the thermal degradation rate of said polymer, and so as to substantially inhibit said polymer gassing.

2. A process according to claim 1, wherein the stabilizer is an isocyanate having at least two isocyanate groups.

3. A process according to claim 2, wherein the isocyanate is an aromatic isocyanate having at least two isocyanate groups.

4. A process according to claim 2, wherein the polymer is converted to plastic form at an elevated temperature between about 150° and about 210° C. and an elevated pressure between about 100 and about 1500 pounds per square inch and shaped by injection through the constricted orifice into a closed mold in an operation which would ordinarily be accompanied by polymer gassing and degradation, the thermal degradation rate being reduced to a rate not higher than 0.3 weight percent per minute as determined when the polymer is maintained in an open vessel in a circulating air oven at 222° C.

5. A process for the production of modified oxymethylene polymer which comprises:
(A) dispersing onto
(1) an oxymethylene polymer, containing at least 85 mole percent of oxymethylene (—$CH_2O$—) units interspersed with up to about 15 mole percent of (—OR—) units, wherein R is a divalent radical containing at least two carbon atoms directly linked to each other and positioned in the chain between the two valences, with any substituent in the R radical being inert, said polymer having at least two active hydrogen atoms, as determined by the Zerewitinoff test,
(2) at least one bifunctional coupling agent having the formula $R'—(NCX)_n$ wherein X is an atom selected from the group consisting of oxygen and sulfur, $n$ is an integer selected from the group consisting of 2 and 3, and $R'$ is an organic radical derived from the group consisting of aliphatic, cycloaliphatic and aromatic moieties having one to twenty carbon atoms, and,
(B) thereafter, prior to reacting any of said coupling agent with said polymer, blending and reacting said polymer and bifunctional coupling agent at a temperature between about 100° C. and 275° C. by passing the polymer and coupling agent through a constricted orifice so as to reduce the thermal degradation of the polymer.

6. The process according to claim 5, wherein said reaction takes place in the presence of a catalytic amount of urethane catalyst.

7. The process according to claim 6, wherein the oxymethylene polymer has a number average molecular weight of at least 30,000.

8. A process for the production of modified oxymethylene polymer which comprises:
(A) dispersing onto an oxymethylene polymer having at least two active hydrogen atoms, as determined by the Zerewitinoff test, and being selected from the group consisting of
(1) oxymethylene copolymers having a melt index between about 2.0 and 10.0 and containing at least 85 mole percent of (—$CH_2O$—) units, interspersed with up to about 15 mole percent of (—OR—) units, wherein R is a divalent radical containing at least two carbon atoms directly linked to each other and positioned in the chain between the two valences, with any substituent in the R radical being inert,
(2) oxymethylene terpolymers, containing at least 85 mole percent of oxymethylene (—$CH_2O$—) units interspersed with up to about 15 mole percent of (—OR—) units, wherein R is a divalent radical containing at least two carbon atoms directly linked to each other and positioned in the chain between the two valences, with any substituent in the R radical being inert, and at least 0.01 up to 7 mole percent of said (—OR—) units having carbon atoms linked to other chains, and
(3) a mixture of (1) and (2),
from about 0.8 to about 1.2 moles, based on the polymer, of at least one bifunctional coupling agent having the formula $R'—(NCX)_n$ wherein X is an atom selected from the group consisting of oxygen and sulfur, $n$ is an integer selected from the group consisting of 2 and 3, and $R'$ is an organic radical derived from the group consisting of aliphatic, cycloaliphatic and aromatic moieties having one to twenty carbon atoms, and substituted derivatives thereof wherein the substituents are inert,
(B) thereafter, prior to reacting any of said coupling agents with said polymer, blending and reacting said polymer and bifunctional coupling agentt at a temperature between about 100° C. and 275° C. by passing the polymer and coupling agent through a constricted orifice so as to reduce the thermal degradation of the polymer, and (C) recovering an oxymethylene polymer product having a melt index of below 1.0, a $10x$ melt index/$1x$ melt index ratio of at least 25, and a melt elasticity of at least 20 percent.

9. The process according to claim 8, wherein the bifunctional coupling agent is 1,5-naphthalene diisocyanate.

References Cited

UNITED STATES PATENTS

| | | | |
|---|---|---|---|
| 3,103,499 | 9/1963 | Dolce et al. | 260—67 |
| 3,147,234 | 9/1964 | Polly | 260—67 |
| 3,043,801 | 7/1962 | Wagner et al. | 260—67 |
| 3,046,251 | 7/1962 | Wagner | 260—67 |

WILLIAM H. SHORT, *Primary Examiner.*

R. T. LYON, *Assistant Examiner.*